(12) United States Patent
Sommer

(10) Patent No.: US 7,667,425 B2
(45) Date of Patent: Feb. 23, 2010

(54) METHOD AND DEVICE FOR CONTROLLING A DOOR/GATE DRIVE

(75) Inventor: Frank Sommer, Kirchheim (DE)

(73) Assignee: Sommer Antriebs- und Funktechnik GmbH, Kirchheim (DE)

( * ) Notice: Subject to any disclaimer, the term of this patent is extended or adjusted under 35 U.S.C. 154(b) by 259 days.

(21) Appl. No.: 10/548,565

(22) PCT Filed: Feb. 20, 2004

(86) PCT No.: PCT/EP2004/001649

§ 371 (c)(1),
(2), (4) Date: Jul. 14, 2006

(87) PCT Pub. No.: WO2004/081681

PCT Pub. Date: Sep. 23, 2004

(65) Prior Publication Data

US 2006/0255757 A1    Nov. 16, 2006

(30) Foreign Application Priority Data

Mar. 11, 2003 (DE) ................. 103 10 480

(51) Int. Cl.
*H02P 1/06* (2006.01)
(52) U.S. Cl. .................. 318/700; 318/257; 318/469
(58) Field of Classification Search ............ 318/700, 318/257, 469
See application file for complete search history.

(56) References Cited

U.S. PATENT DOCUMENTS

| | | | | |
|---|---|---|---|---|
| 5,770,934 A * | 6/1998 | Theile | .......... | 318/469 |
| 6,051,945 A * | 4/2000 | Furukawa | .......... | 318/280 |
| 6,249,097 B1 * | 6/2001 | Frey et al. | .......... | 318/257 |
| 6,366,042 B1 * | 4/2002 | Gerbetz | .......... | 318/286 |

(Continued)

FOREIGN PATENT DOCUMENTS

CN    1255456 A    6/2000

(Continued)

OTHER PUBLICATIONS

Chinese Thesis Paper entitled "Development of a variable frequency speed control system for an elevator door", Jan. 20, 2002, pp. 29, 30, 33-37, 56-58.

(Continued)

*Primary Examiner*—Walter Benson
*Assistant Examiner*—Renata McCloud
(74) *Attorney, Agent, or Firm*—Venable LLP; Robert Kinberg; Steven J. Schwarz

(57) ABSTRACT

The invention relates to a method and a device for controlling an electric door drive. During a learning process determination of the course over time of the torques of the door drive for each of at least one opening process and closing process is carried out. Maximum permissible torques are derived from the ascertained torques for predetermined zones within an opening process and closing process. During operation of the door drive a comparison of the current torque with the maximum torques and a comparison of the current speeds of the door drive with predetermined target speeds are carried out. The current speed of the door drive is increased if the associated target speed is fallen below. In addition, switching-off the door drive takes place if the current torque exceeds the associated maximum torque.

17 Claims, 3 Drawing Sheets

U.S. PATENT DOCUMENTS 6,404,158 B1 * 6/2002 Boisvert et al. .............. 318/469

FOREIGN PATENT DOCUMENTS

| DE | 42 14 998 | 11/1993 |
|---|---|---|
| DE | 196 28 238 | 1/1998 |
| DE | 197 00 828 | 7/1998 |
| WO | WO 00/42687 | 7/2000 |
| WO | WO 01/18624 | 3/2001 |

OTHER PUBLICATIONS

Office Action from corresponding Chinese Application No. 200480006661.X dated May 12, 2008.

* cited by examiner

METHOD AND DEVICE FOR CONTROLLING A DOOR/GATE DRIVE

The invention relates to a method and a device for controlling a door drive.

A method of that kind is known from DE 196 28 238 A1. With this method a so-called force switching-off is provided as a safety function for a door drive. This means that the door drive is stopped in the case of occurrence of an increased need for force, which arises particularly when an object or a person blocks the door driven by the door drive, so as to avoid injuries to persons or damage to objects.

According to this method, prior to placing the door drive in operation there is carried out a measuring cycle in which the actual force requirement of the door drive over the travel path is ascertained. In that case the measuring cycle comprises at least one of each of a complete opening cycle and closing cycle of the door drive.

The door drive comprises an electric motor by which the door, particularly a garage door, is driven. The force requirement of the door drive is ascertained by determining the torque of the electric motor. The measuring cycle is carried out at constant, maximum speed, without speed reduction at the end of the movement path of the door.

The opening process and closing process of the door drive are each subdivided into a predetermined number of zones, wherein the duration of each zone can be established in dependence on the determined torques. A maximum permissible torque is defined within each zone. The maximum torques are determined for the individual zones in such a manner that the maximum permissible torque is at least of the same size as the highest torque which has arisen within the respective zone during the measuring cycle.

During subsequent operation of the door drive the currently registered torques are compared with the respective maximum torques of the respective zones. If the current torque exceeds the maximum torque of the respective zone, emergency stopping of the door drive takes place.

It is advantageous with this method that a safety function for a door drive is provided with relatively low control cost.

In particular, it is advantageous that through division of the opening and closing processes of the door drive into individual zones only a low control outlay is required for provision of the safety function.

Through the zonal division of the opening and closing processes a coarse grid division of these movement courses is effected. In that case only one measurement value in the form of the maximum permissible torque is associated with each zone as switch-off criterion for the door drive.

Therefore only a few measuring points are needed for control of the door drive, whereby the control can be carried out with low cost and correspondingly rapidly.

However, disadvantageous in this connection is an undesired high response time of the control. Depending on the respective position of a currently ascertained torque within a zone and relative to the maximum permissible torque a considerable delay in time can elapse, on engagement of an obstacle in the door, until the current torque exceeds the maximum permissible torque. Undesired high delay times in triggering of the emergency stop thereby arise, which can lead to risks to persons. Moreover, in the case of installation of door drives it is necessary to observe prescribed standards defining limit values for these delay times. Maintenance of prescribed standards of that kind is problematic in the case of a method according to DE 196 28 238 A1.

The invention is based on the task of so constructing a method and a device of the kind stated in the introduction that a reliable control of the door drive is ensured with smallest possible outlay.

The features of claims 1 and 12 are provided for solution of this task. Advantageous forms of embodiment and expedient developments of the invention are described in the subclaims.

In the case of the method according to the invention for controlling an electric door drive initially determination of the course over time of the torques of the door drive for each of at least one opening process and closing process is carried out during a learning process. Maximum permissible torques are then derived from the ascertained torques for predetermined zones within an opening process and closing process. During subsequent operation of the door drive a comparison of the current torques with the maximum torques and a comparison of the current speeds of the door drive with predetermined target speeds are carried out. The current speed of the door drive is then increased in the case of falling below the associated target speed and the door drive switched off if the current torque exceeds the associated maximum torque.

In the case of the method according to the invention maximum torques are thus defined as switch-off criterion for the door drive within the individual zones of the opening process and closing process, wherein an emergency stop of the door drive is carried out when the current torque of the door drive exceeds the respective maximum torque.

According to the invention this switch-off control is combined with a control of the speed of the door drive. In that case, with particular advantage the speed of the door drive is regulated to a target speed profile.

It is achieved by this combination that the control of the door drive ensures not only a reliable, but also a sufficiently rapid response of the force switching-off.

If engagement of an obstacle in the door to be controlled is present, then not only the force requirement of the door drive is increased, which corresponds with an increase in torque. In addition, in that case the rotational speed of the door drive also reduces, which corresponds with a reduction in speed, so that the current speed sinks below the respective predetermined target speed.

According to the invention the current speed is thereupon increased, wherein this is preferably regulated to the target speed. Not only the rotational speed of the door drive is thereby increased, but by way of the stressing of the door drive also the electrical current intensity and thus the torque of the door drive.

In the case of continuing obstacle engagement the current torque is thereby rapidly increased and the maximum permissible torque is correspondingly rapidly exceeded. Thus an extremely short response time of the force switching-off means is attained, whereby on the one hand risks to persons and objects are securely avoided and in addition the applicable prescribed standards for the force switching-off means can be maintained.

In the case of a short-term increase in torque, which can arise, for example, by additional friction in the guide of the door in the case of contaminations or the like, the obstacle is overcome by a short-term increase in speed without the force switching-off means being activated. The serviceability of the door drive is thereby increased.

The invention is explained in the following on the basis of drawings, in which.

Figure 1:
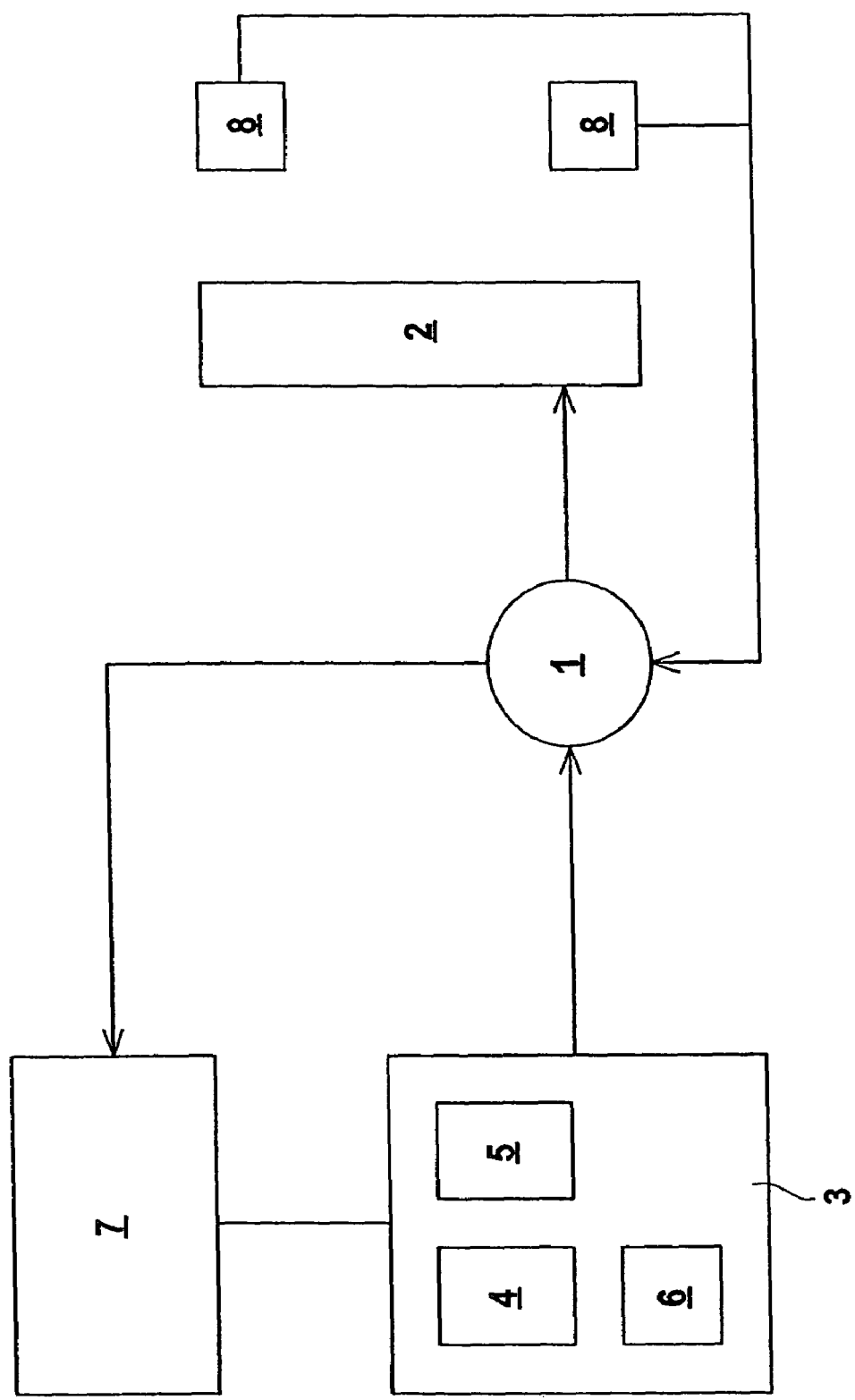
FIG. 1 shows a schematic illustration of a device for controlling a door drive.

FIG. 1 shows the construction of a device for controlling a door drive 1. The door drive 1 substantially consists of an electric motor, which drives a door 2. The door 2 is formed, in the present case, by a garage door.

For controlling the door drive 1 there is provided a computer unit 3 which is generally formed by a microprocessor system. A memory unit 4 for storage of data and parameters is provided in the computer unit 3. Moreover, the computer unit 3 comprises a regulator unit 5, by means of which the speed of the door drive 1 is regulated. Finally, the computer unit 3 comprises a time measuring unit 6, which substantially comprises a cycle oscillator for presetting a time cycle.

A measuring unit 7 is connected with the computer unit 3. Means for determining the torque as well as means for determining the speed of the door 1 are provided in the measuring unit 7.

The means for determining the torque of the door drive 1 are formed substantially by a measuring circuit, by means of which the electrical current strength supplied to the electric motor is measured, which forms a measure for the torque of the door drive 1. The torque determination is to be generally interpreted as determination of the force requirement, wherein the term torque determination is generally employed for determination of a characteristic magnitude for this required force.

The means for determining the speed of the door drive 1 are essentially formed by a measuring circuit, by means of which the rotational speed of the electric motor is detected.

In combination with the time measuring unit 6 of the computer unit 3 it is possible to determine by means of the measuring unit 7 not only the course over time of the speed, but also the course of torque of the door drive 1.

The door 2 can be moved between an upper and a lower end position, wherein for control of the end positions limit switches 8, the signals of which are led to the door drive 1, are provided.

Figure 2:
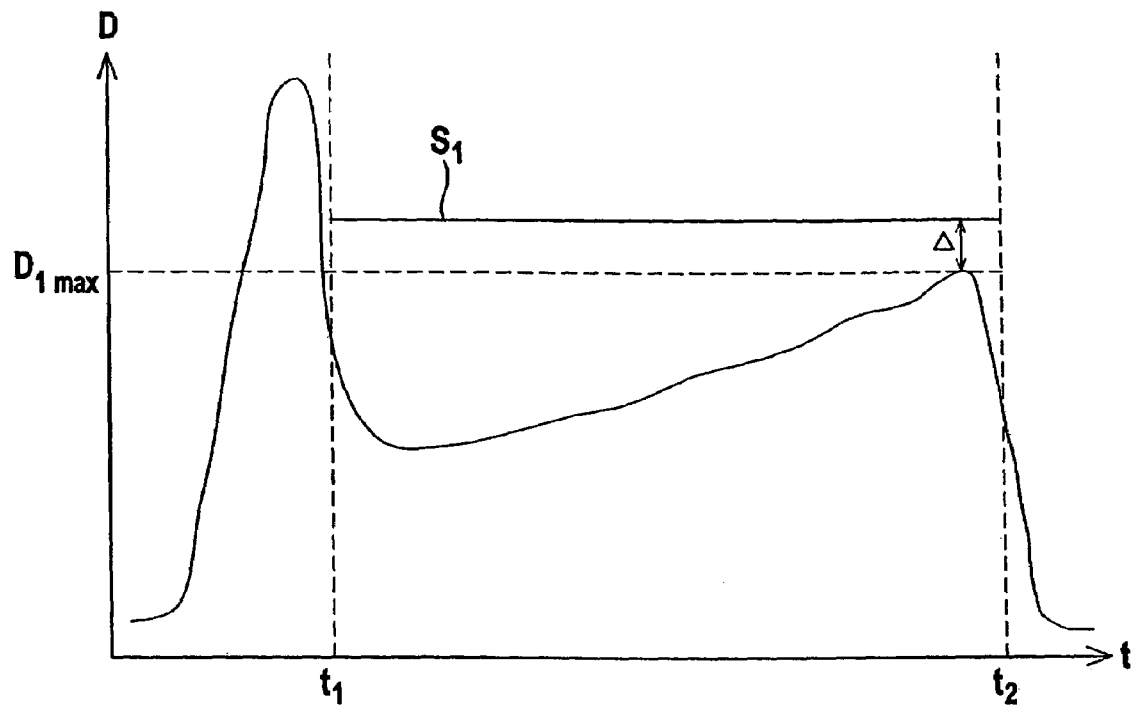
FIG. 2 shows a schematic illustration of the course of torque over time of the door drive according to FIG. 1 for an opening process.

FIG. 2 schematically shows the course of torque over time of the door drive 1 during an opening process, i.e. during movement of the door 2 from the lower to the upper end position. Correspondingly, FIG. 3 shows the course of torque over time of the door drive 1 during a closing process, i.e. during movement of the door 2 from the upper to the lower end position.

Figure 3:
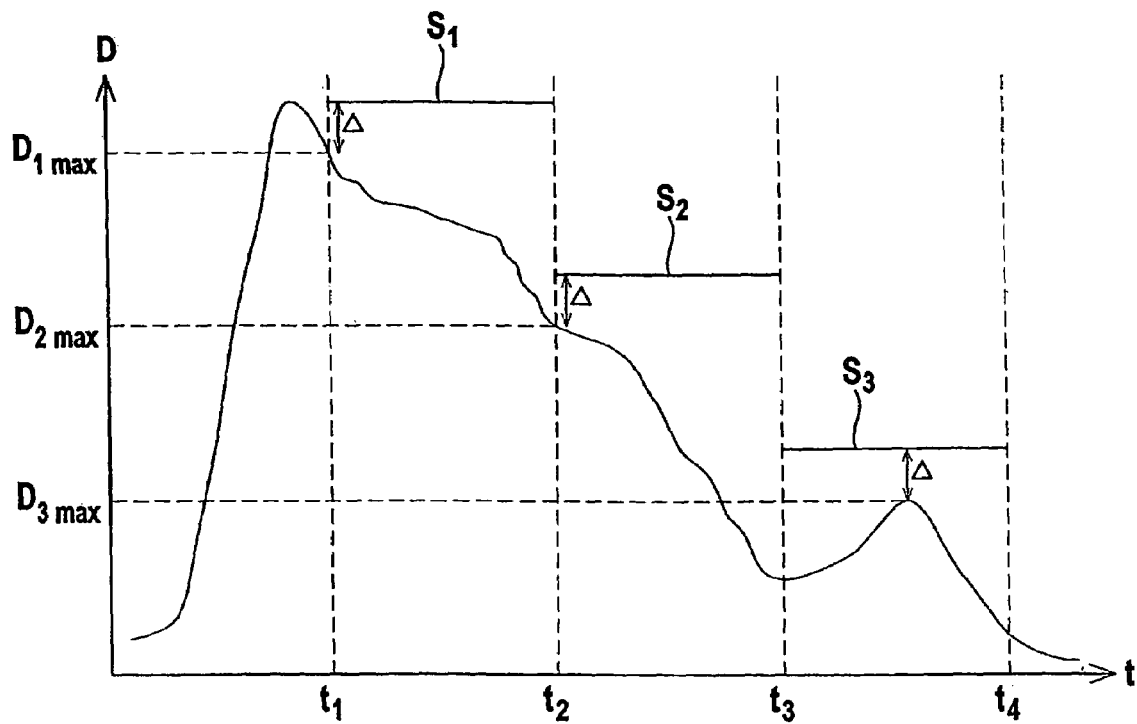
FIG. 3 shows a schematic illustration of the course of torque over time of the door drive according to FIG. 1 for a closing process and FIG. 4 shows a schematic illustration of the speed profile of the door drive according to FIG. 1 for an opening process.

As apparent from FIGS. 2 and 3, the torque of the door drive 1 is strongly increased in the start-up phase at the beginning of an opening process and closing process. In the case of the opening process illustrated in FIG. 2, the torque strongly declines during the start-up phase and then rises substantially continuously. Since the door drive 1 is switched off in its upper end position by means of the limit switch 8, a peak of the torque course, such as occurred in the start-up phase, is avoided at the end of the opening process. In the case of the closing process illustrated in FIG. 3, the torque declines substantially continuously after the start-up phase. In this case, as well, on movement of the door drive into the lower end position a high torque peak is suppressed by the limit switch 8.

Prior to placing the door drive 1 into operation a learning process is undertaken. Within the learning process there are determined from the torque courses of the opening and closing process maximum permissible torques which serve as a criterion for force switching-off during operation of the door drive 1. The force switching-off provides an emergency stop of the door drive 1 for the case that the door 2 runs against an obstacle.

During the learning process there is ascertained by means of the measuring unit 7 the course of torque over time not only for a complete opening process, but also for a complete closing process. In principle, also a multiple determination of the courses of torque can be carried out.

The torque courses are respectively divided into a number of zones of predetermined time duration. The number of zones as well as the time intervals over which the zones extend can be selected to be application-specific for the respective door drive 1 and matched to the respective torque courses.

In the present case, in the zone division the start-up phase with the torque peak during the opening and closing process is excluded. The remaining torque courses are subdivided into the zones.

As illustrated in FIG. 2, only one zone is defined for the opening process, the duration $T=t_2-t_1$ of which extends over the entire torque course subsequent to the start-up phase.

In the present case three zones of the same duration are defined for the closing process. The duration $T_1$ of the first zone amounts to $T_1=t_2-t_1$. The duration of the second zone amounts to $T_2=t_3-t_2$. The duration of the third zone amounts to $T_3=t_4-t_3$.

The respective maximum torque $D_{imax}$ is determined in the computer unit 3 within each zone i. From this maximum value there is determined for the respective zone i a threshold value $S_i$ which forms the maximum permissible torque within this zone. In the present example of embodiment the threshold values $S_i$ for the zones i are defined in such a manner that there is added to the maximum torques $D_{imax}$ of the individual zones in each instance the same positive constant $\Delta$. The threshold values $S_i$ are thus calculated according to the following equation:

$$S_i = D_{imax} + \Delta$$

In principle there could also be defined for the individual zones variable magnitudes $\Delta_i$ which are added to the respective maximum values $D_{imax}$.

In the present case a threshold value $S_1$ is obtained as maximum permissible torque as result of the learning process for the zone of the opening process. The threshold values $S_1$, $S_2$ and $S_3$ are obtained as maximum permissible torques for the three zones i=1, 2, 3 of the closing process.

During the operation of the door drive 1 following the learning process the current torques are determined not only for the opening process, but also for the closing process and are compared with the maximum permissible torques. During the opening process the current torque is thus compared with the threshold value $S_1$ according to FIG. 1. During the closing process, depending on in which zone i the current torque lies, this is compared with the threshold value $S_1$, $S_2$ or $S_3$ belonging to this zone.

As soon as the current torque exceeds the respective current threshold value $S_i$ there takes place a force switching-off in which the door drive 1 is switched off by way of a switching command generated by the computer unit 3. A switching output forming a switching means by way of which the control command can be issued can be integrated in the computer unit 3. In principle also external switching means, such as relays or the like, can be provided.

In this manner there takes place an effective protection of persons or objects entering into the door drive 1 and blocking this.

In the case of regular operation of the door drive 1 the current torque always lies below the threshold value $S_i$, since this was derived during the learning process from the actual conditions of the door drive 1 and, in addition, was so selected that the threshold value $S_i$ of a zone lies above the maximum torque arising in the zone i.

If an obstacle blocks the door 2, the force requirement of the door drive 1 and thus the torque thereof are increased, so that the value of the torque lies above the respective threshold values $S_i$, whereby the force switching-off is triggered.

Depending on the respective position of the current torque within the respective zone a certain time period elapses until the torque increase as a consequence of intervention of an obstacle leads to triggering of the force switching-off.

In order to keep this delay time as short as possible, in the case of a door drive 1 the current speed of the door drive 1 is additionally detected and compared with predetermined target values. If the current speed falls below the target value, then this is further increased.

In the case of engagement of an obstacle in the door 2 there is obtained apart from an increase in torque also a reduction in rotational speed and thus a reduction in speed of the door drive 1. Due to the increase in the speed of the door drive 1 following thereupon the electrical current intensity and thus also the torque of the torque drive 1 are increased. Through this effect the rise in torque is accelerated in the case of engagement of an obstacle and thus the delay time between the beginning of the engagement of the obstacle and a force switching-off is substantially reduced. In the case of a temporary increase in torque, which, for example, is caused by friction effects, the current torque remains below the respective threshold value notwithstanding a brief increase in speed, so that an unnecessary force switching-off is avoided.

Figure 4:
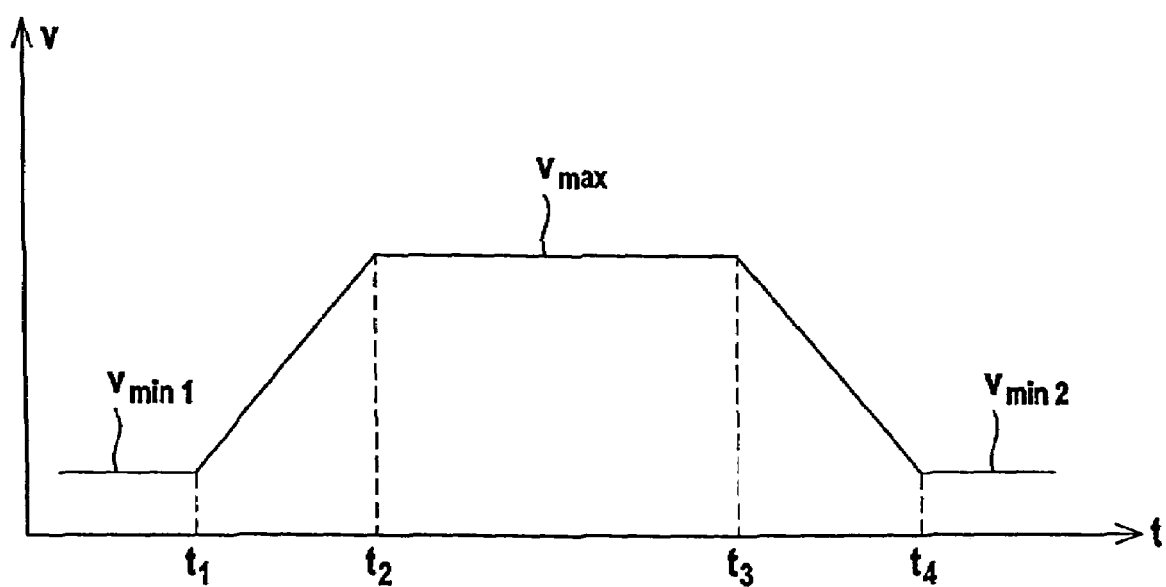

In a particularly advantageous form of embodiment the speed of the door drive 1 is regulated. Target speed profiles are predetermined as target values for both the opening process and the closing process. FIG. 4 shows the course over time of such a target speed profile for the opening process of the door drive 1. After movement of the door 2 out of its lower end position the door drive 1 is accelerated during an acceleration phase in the time interval between $t_1$ and $t_2$ with a constant acceleration from a speed $V_{min1}$ to a speed $v_{max}$. A phase then adjoins within which the speed of the door drive 1 is kept constant at $v_{max}$. This phase lies in the time interval between $t_2$ and $t_3$. A delay phase joins thereat in the time interval between $t_3$ and $t_4$, within which the door drive 1 is braked with constant speed gradients from the speed $v_{max}$ to the speed $v_{min2}$. Subsequently the door drive 1 in its upper end position is switched off by means of the limit switch 8. In the present case the speeds $v_{min1}$ and $v_{min2}$ are selected to be of the same amount. The target speed profile for the closing process corresponds with the form of the speed profile according to FIG. 4. Merely the absolute values for the target speed values as well as the lengths of the phases defining times $t_1$-$t_4$ can be varied in terms of amount.

In that case the speed $v_{min1}$, $v_{min2}$ and $v_{max}$ are filed in the memory unit 4 of the computer unit 3 as speed parameters for presetting the target speed profiles. Preferably, the speed gradients during the acceleration phase and delay phase are also filed in the memory unit 4.

The precise presetting of the target speed profiles advantageously takes place during a learning run. In the case of this learning run the door drive 1 is accelerated within the predetermined acceleration phase, such as illustrated, for example, in FIG. 4, from the speed $v_{min1}$ to the speed $v_{max}$ not only during the opening process, but also during the closing process. Subsequently the door drive 1 is moved at constant speed until in its end position, wherein the running time of the door drive 1 is in that case detected. The time instant $t_3$ at which the delay phase is to be initiated is then calculated in the computer unit 3 from this running time. In this manner the target speed profile is established not only for the opening process, but also for the closing process.

During the operation of the door drive 1 the speed of the door drive 1 is then regulated by means of the regulator unit 4 to the predetermined target speed profile.

The invention claimed is:

1. Method of controlling an electric door drive, comprising the following method steps:
   determining the course over time of the torque of the door drive during a learning process for each of at least one opening process and closing process,
   deriving maximum permissible torques from the ascertained torques for predetermined zones within an opening process and a closing process,
   combining a shut-down control and a speed control for the door by comparing the current torques with the maximum torques and comparing the current speeds of the door drive with predetermined target speeds during operation of the door drive,
   increasing the current speed of the door drive if an obstacle enters the door and thereby reduces the current speed to below the associated target speed, and also increases the current torque, and
   switching off the door drive if the current torque exceeds the associated maximum torque.

2. Method according to claim 1, characterised in that a respective target speed profile is predetermined for each of the opening process and the closing process.

3. Method according to claim 2, characterised in that current speed is regulated, wherein the target values of the regulating circuit are formed by the target speed profiles.

4. Method according to claim 2, characterised in that the target speed profiles are defined by speed parameters.

5. Method according to claim 4, characterised in that each speed profile is formed by an acceleration phase with constant speed gradients for acceleration of a speed $V_{min1}$ to a maximum speed $V_{max}$, from a succeeding phase with constant speed $V_{max}$ and from a retardation phase with constant speed gradients for braking from the maximum speed $V_{max}$ to a speed $V_{min2}$.

6. Method according to claim 5, characterised in that the speeds $V_{min1}$, $V_{min2}$ and $V_{max}$ form the speed gradients and the duration of each phase forms the speed parameters.

7. Method according to claim 5, characterised in that for determination of a speed profile a learning run is carried out in which the door drive is accelerated during the acceleration phase from the speed $V_{min1}$ to the maximum speed $V_{max}$, wherein the door drive is moved at this maximum speed $V_{max}$ to its end position and that the beginning of the retardation phase is calculated from the running time of the door drive.

8. Method according to claim 1, characterised in that the opening process and closing process are respectively divided into zones of equal duration.

9. Method according to claim 8, characterised in that the closing process is subdivided into several zones.

10. Method according to claim 8, characterised in that one zone is allocated to the opening process.

11. Method according to claim 8, characterised in that during the learning process the maximum torque $D_{imax}$ is determined from the ascertained torques for each zone i and that the threshold value $S_i$ is calculated for each zone i as maximum permissible torque according to $S_i = D_{imax} + \Delta$, wherein $\Delta$ is a positive constant.

12. Device for controlling a door drive, comprising: means for determining the torque of the door drive, means for determining the current speeds of the door drive, and a computer unit in which during a learning process the course over time of the torque of the door drive is determinable for each of at least one opening process and closing process and in which maximum permissible torques for predetermined zones within an opening process and closing process are derivable from the ascertained torques, a memory unit for storage of predetermined target speeds during operation of the door drive, wherein a shut-down control and a speed control for the door are combined in the computer unit to generate a control command to increase the current speed of the door drive if during operation of the door drive an obstacle enters the door and thereby reduces the current speed to below the associated target speed and also increases the current torque, and switching means controlled by the computer unit, wherein a switching command for switching off the door drive can be generated therein if the current torque during operation of the door drive exceeds the associated maximum torque.

13. Device according to claim 12, characterised in that the door drive comprises an electric motor.

14. Device according to claim 13, characterised in that the means for determining the torque comprise a measuring circuit for determining the electrical current intensity of the electric motor.

15. Device according to claim 13, characterised in that the means for determining the speed of the door drive comprise a measuring circuit for determining the rotational speed of the electric motor.

16. Device according to claim 12, characterised in that the computer unit comprises a regulator unit for regulating the speed of the door drive.

17. Device according to claim 12, characterised in that the door drive comprises limit switches for switching off the drive in its end positions.

* * * * *

UNITED STATES PATENT AND TRADEMARK OFFICE
CERTIFICATE OF CORRECTION

PATENT NO. : 7,667,425 B2  Page 1 of 1
APPLICATION NO. : 10/548565
DATED : February 23, 2010
INVENTOR(S) : Frank Sommer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 380 days.

Signed and Sealed this

Seventh Day of December, 2010

David J. Kappos
*Director of the United States Patent and Trademark Office*